(12) United States Patent
Iwasawa

(10) Patent No.: US 7,468,748 B2
(45) Date of Patent: Dec. 23, 2008

(54) IMAGING APPARATUS

(75) Inventor: Yoshito Iwasawa, Tokyo (JP)

(73) Assignee: Sony Corporation (JP)

( * ) Notice: Subject to any disclaimer, the term of this patent is extended or adjusted under 35 U.S.C. 154(b) by 615 days.

(21) Appl. No.: 11/115,292

(22) Filed: Apr. 27, 2005

(65) Prior Publication Data
US 2005/0248669 A1 Nov. 10, 2005

(30) Foreign Application Priority Data
May 7, 2004 (JP) ............... P2004-138872

(51) Int. Cl.
H04N 5/262 (2006.01)

(52) U.S. Cl. ............... 348/240.99; 348/240.1; 348/240.2; 348/240.3

(58) Field of Classification Search ............ 348/208.11, 348/240.3, 340, 240.99, 240.1, 240.2, 351, 348/360
See application file for complete search history.

(56) References Cited

U.S. PATENT DOCUMENTS

| 3,945,034 | A |   | 3/1976 | Suzuki |
|---|---|---|---|---|
| 3,954,034 | A | * | 5/1976 | Broderick ............... 83/117 |
| 3,976,363 | A | * | 8/1976 | Toyama et al. ............ 359/629 |
| 4,345,271 | A | * | 8/1982 | Sekiguchi ............... 348/175 |
| 4,444,472 | A | * | 4/1984 | Tanaka ............... 359/676 |
| 5,235,466 | A | * | 8/1993 | Ono et al. ............... 359/684 |
| 6,728,482 | B2 |   | 4/2004 | Hagimori et al. ......... 396/72 |
| 6,754,446 | B2 | * | 6/2004 | Hagimori et al. ......... 396/72 |
| 7,180,452 | B2 | * | 2/2007 | Saito ............... 343/702 |
| 2002/0149692 | A1 | * | 10/2002 | Tomita et al. ............ 348/345 |
| 2004/0008271 | A1 | * | 1/2004 | Hagimori et al. ......... 348/359 |
| 2004/0095503 | A1 | * | 5/2004 | Iwasawa et al. .......... 348/344 |

FOREIGN PATENT DOCUMENTS

| EP | 0 531 925 A1 | 3/1993 |
|---|---|---|
| EP | 1 363 152 A1 | 11/2003 |
| JP | 08-248318 | 9/1996 |
| JP | 08-248318 A | 9/1996 |
| JP | 10-054934 A | 2/1998 |
| JP | 2002-006234 A | 1/2002 |
| JP | 2004-061569 A | 2/2004 |

OTHER PUBLICATIONS

GB Examination Report dated Aug. 2, 2005.
JPO Office Action, App. No. 2004-138872, Jul. 7, 2008 (2 pages).

* cited by examiner

Primary Examiner—Tuan Ho
Assistant Examiner—Tuan H Le
(74) Attorney, Agent, or Firm—Rader Fishman & Grauer PLLC; Ronald P. Kananen

(57) ABSTRACT

An imaging apparatus includes: a zoom lens system including a plurality of groups and performing variable magnification by changing intervals of the lens groups; a color-separation optical system configured to carry out color separation of a light flux from the zoom lens system; and a plurality of imaging devices configured to convert optical images separated by colors by the color-separation optical system into electric signals. The zoom lens system includes at least one reflection member configured to bend an optical axis by 90 degrees or approximately 90 degrees. The color-separation optical system is arranged such that color-separation is performed in a direction within a plane perpendicular to another plane formed by an optical axis for light incident to the zoom lens system and an optical axis for light reflected by the reflection member.

6 Claims, 7 Drawing Sheets

IMAGING APPARATUS

CROSS REFERENCES TO RELATED APPLICATIONS

The present invention contains subject matter related to Japanese Patent Application JP 2004-138872 filed in the Japanese Patent Office on May 7, 2004, the entire contents of which are incorporated herein by reference.

BACKGROUND OF THE INVENTION

1. Field of the Invention

The present invention relates to an imaging apparatus and a digital input/output device such as a digital still camera, a video camera, etc.

2. Description of the Related Art

In recent years, imaging apparatuses, such as a digital still camera, using solid state imaging devices are spreading.

Previously, many models of digital still cameras were provided with a function of imaging still pictures. Recently, digital still cameras capable of recording video images with a large recording capacity has become more common as a solid state memory used for a recording medium of the digital still camera has increased in capacity.

On the other hand, higher definition in pictures is desired. In particular, for a digital still camera with a large number of pixels it is desirable to have an imaging lens or, especially, a zoom lens excellent in image formation capability matching with a solid state imaging device with such a large number of pixels and to be configured with small dimensions, and especially thinner in the depth direction.

Further, it is preferable for digital still cameras capable of taking still pictures to have a shape which is thin in a front-to-back direction and long horizontally or vertically for the ease of holding and preventing camera shake at the time of taking a picture. In order to realize such a shape, i.e. thin in the front-to-back direction or in the depth direction, it is preferable to make an imaging optical system thin.

For example, in an imaging optical system disclosed in Japanese Patent Application Publication No. H08-248318, an optical system of a zoom lens, which is constituted by a first lens group having positive refracting power, a second lens group having negative refracting power, a third lens group having positive refracting power, and a fourth lens group having positive refracting power, is bent by inserting a prism between lenses, thereby thinning a dimension in the optical axis direction.

SUMMARY OF THE INVENTION

However, in order to attain higher image quality, it is highly desirable to increase the number of pixels. If the number of pixels is increased by adopting the zoom lens disclosed in Japanese Patent Application Publication No. H08-248318, it is preferable to have an enlarged imaging device, thereby increasing the entire size of the optical system therein. In connection with this, a front lens and a reflection member are caused to be large, so that the objective of miniaturization may not be fully attained.

Accordingly, it is desirable to increase the number of pixels and attain miniaturization, in particular miniaturization in a depth direction. In view of the situations, the present invention is made.

According to an embodiment of the present invention, there is provided an imaging apparatus including: a zoom lens system; a color-separation optical system configured to carry out color separation of a light flux from the zoom lens system; and a plurality of imaging devices configured to convert optical images separated by colors by the color-separation optical system into electric signals. The zoom lens system includes at least one reflection member configured to bend an optical axis by 90 degrees or approximately 90 degrees. Further, the color-separation optical system is arranged such that the color-separation is performed in a direction within a plane perpendicular to another plane formed by an optical axis for light incident to the zoom lens system and an optical axis for light reflected by the reflection member.

Accordingly, an imaging apparatus in accordance with the present embodiment allows the achievement of miniaturization in the depth direction even if a plurality of imaging devices are included therein.

According to another embodiment of the present invention, there is provided an imaging apparatus including: a zoom lens system including a plurality of groups and performing variable magnification by changing intervals of the lens groups; a color-separation optical system configured to carry out color separation of a light flux from the zoom lens system; and a plurality of imaging devices configured to convert optical images separated by colors by the color-separation optical system into electric signals. The zoom lens system includes at least one reflection member configured to bend an optical axis by 90 degrees or approximately 90 degrees. Further, the color-separation optical system is arranged such that the color-separation is performed in a direction within a plane perpendicular to another plane formed by an optical axis for light incident to the zoom lens system and an optical axis for light reflected by the reflection member.

Accordingly, the number of pixels can be increased without enlarging each imaging device since an imaging apparatus in accordance with the present embodiment is provided with the plurality of imaging devices, and it is possible to avoid enlargement of a front lens or a reflection member in response to an enlarged imaging device. In other words, it is possible to miniaturize a zoom lens system and/or an imaging device by reducing the sizes of the front lens and/or the reflection member, thereby allowing miniaturizing of the zoom lens system, and, further, miniaturizing the imaging apparatus.

Further, by bending an optical path by 90 degrees by means of the reflection member, the miniaturization in the depth direction is attained, and the further miniaturization in the depth direction is also attained by limiting the color-separation direction by means of the color-separation optical system.

Alternatively, the zoom lens system may include a first lens group configured to have a positive refracting power and be fixed during the zooming operation, and the reflection member may be included in the first lens group, thereby facilitating its miniaturization. The first lens group of the zoom lens system, especially the front lens thereof, is provided to receive as much light flux as possible and tends to have a larger diameter. Further, the reflection member may be formed with a larger size in the zoom lens system. If such an enlarged first lens group is to move, a drive mechanism capable of providing a large driving force may be needed, thereby causing increase in size of a lens barrel. By fixing the first lens group including the reflection member, it is possible to avoid the necessity of enlarged zoom lens system.

Furthermore, if it is assumed that Tp is the thickness of the reflection member, Y' is the diagonal length of the imaging device, and S is the number of the imaging devices included in the imaging apparatus, it is preferable that the reflection member satisfies the following conditional expression (1):

$$0.2 < Tp/(Y' \times S) < 1.5 \tag{1}$$

This alternative arrangement allows the securing of a required incident light quantity while attaining a miniaturization in the depth direction.

Furthermore, if it is assumed that Tp is the thickness of the reflection member, and Tcp is the optical path length of the color-separation optical system, the reflection member and color-separation optical system satisfy the following conditional expression (2):

$$0.6 < Tp/Tcp < 1.5 \tag{2}$$

This alternative arrangement allows the attainment of miniaturization in the depth direction and the overall length of the lens system.

BRIEF DESCRIPTION OF THE DRAWINGS

The above and other objects, features and advantages of the present invention will become more apparent from the following description of the present exemplary embodiment of the invention taken in conjunction with the accompanying drawings, in which.

DETAILED DESCRIPTION OF EMBODIMENTS

Figure 1:
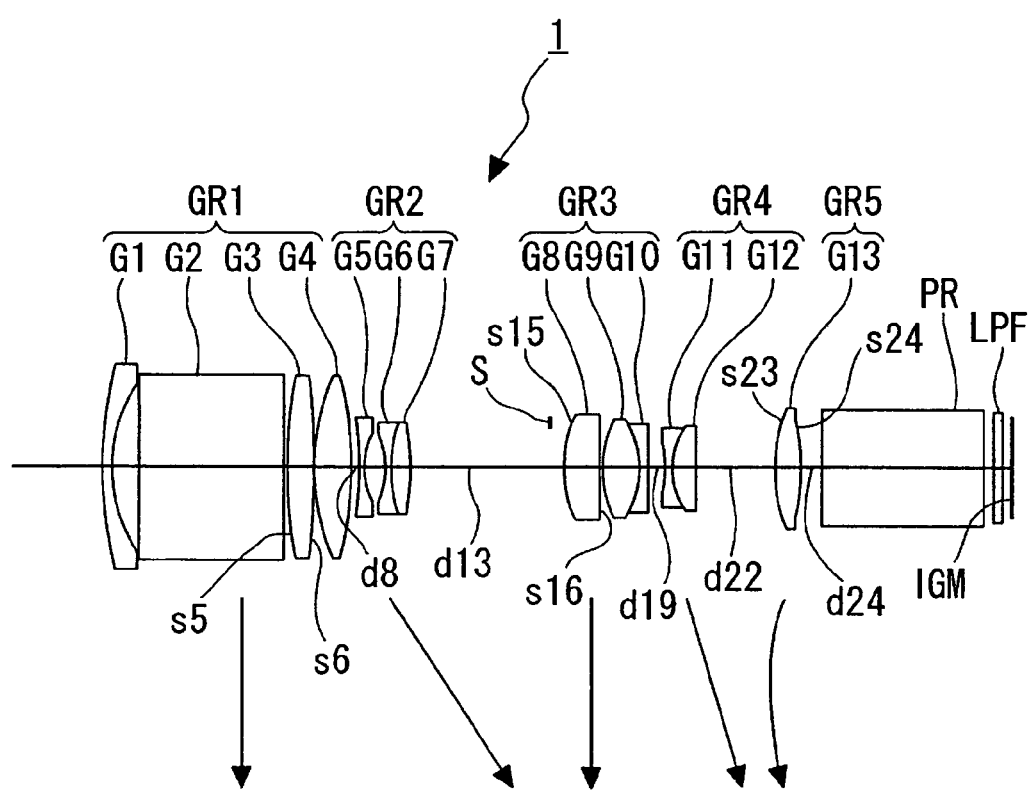
FIG. 1 is a diagram showing, together with FIGS. 2 through 4, a first embodiment of a zoom lens system in an imaging apparatus in accordance with an embodiment of the present invention, and shows a lens structure.

Below, an embodiment of an imaging apparatus in accordance with the present invention will be described with reference to the accompanying drawings.

The imaging apparatus in accordance with the present embodiment includes: a zoom lens system including a plurality of groups and performing variable magnification by changing the intervals of the lens groups; a color-separation optical system configured to carry out color separation of a light flux from the zoom lens system; and a plurality of imaging devices configured to convert optical images separated by colors by the color-separation optical system into electric signals. The zoom lens system includes at least one reflection member configured to bend an optical axis by 90 degrees or approximately 90 degrees. Further, the color-separation optical system is arranged such that the color-separation is performed in a direction within a plane perpendicular to another plane formed by an optical axis for light incident to the zoom lens system and an optical axis for light reflected by the reflection member.

Accordingly, in the imaging apparatus according to the present embodiment, the number of pixels can be increased without enlarging each imaging device since an imaging apparatus in accordance with the present embodiment is provided with the plurality of imaging devices, and it is possible to avoid enlargement of a front lens or a reflection member in response to an enlarged imaging device. In other words, the present embodiment allows the miniaturization of a zoom lens system and/or an imaging apparatus, which uses the same number of pixels or the number of pixels increased with moderate level compared with that of related art, by reducing the sizes of the front lens and/or the reflection member.

Further, by bending an optical path by 90 degrees by means of the reflection member, the miniaturization in the depth direction is attained, and also the further miniaturization in the depth direction is attained by limiting the color-separation direction by means of the color-separation optical system.

Alternatively, it is preferable that the zoom lens system may include a first lens group configured to be fixed during the zooming operation, and the reflection member may be included in the first lens group. The first lens group of the zoom lens system, especially the front lens thereof is provided to receive as much light flux as possible and tends to have a larger diameter. Further, the reflection member may be formed with a larger size in the zoom lens system. If such an enlarged first lens group is to move, a drive mechanism capable of providing a large driving force may be needed, thereby causing an increase in the size of the lens barrel. By fixing the first lens group including the reflection member, it is possible to avoid the necessity of an enlarged zoom lens system.

If a prism is employed as the reflection member, it is preferable to use a glass material having a high refractive index. It is preferable to use a prism made of a glass material having a refractive index of 1.7 or more with respect to the d-ray ($\lambda$=587.6 nm) or more preferably a refractive index of 1.8 or more with respect to the d-ray.

If a color-separation prism separating color by reflection is employed as the color-separation optical system in the zoom lens system, it is preferable to use a glass material having a refractive index of 1.6 or less with respect to the d-ray, because of the ease of providing a preferable reflective property.

In the imaging apparatus in accordance with the present embodiment, assuming that Tp is the thickness of the reflection member, Y' is the diagonal length of the imaging device, and S is the number of the imaging devices included in the imaging apparatus, it is preferable that the reflection member satisfies the following conditional expressions (1):

$$0.2 < Tp/(Y' \times S) < 1.5 \qquad (1)$$

The conditional expression (1) is a conditional expression that specifies the sum of a size of the reflection member in the zoom lens system, and the diagonal lengths of all the imaging devices existing in the imaging apparatus, i.e., the whole size of all the imaging devices existing in the imaging apparatus. In order to reduce the overall thickness of the zoom lens system, it is preferable to reduce the thickness of the reflection member. If the value of Tp/(Y'×S) becomes less than the minimum limit, the reflection member may become too small to secure a required light flux. In other words, the amount of ambient light becomes insufficient. If the value exceeds the maximum limit, the thickness of the reflection member becomes too thick, thereby making it difficult to reduce the thickness in the incident optical axis direction.

Further, in the imaging apparatus in accordance with the present embodiment, assuming that Tp is the thickness of the reflection member and Tcp is the optical path length of the color-separation optical system, it is preferable that the reflection member and the color-separation optical system satisfy the following conditional expression (2):

$$0.6 < Tp/Tcp < 1.5 \qquad (2).$$

The conditional expression (2) is a conditional expression which specifies the size of the reflection member in the zoom lens system and the size of a color-separation device. If the value of Tp/Tcp is less than the minimum limit, the size of the color-separation element becomes large and it is difficult to carry out miniaturization in the overall length direction. If the value exceeds the maximum limit, the thickness of the reflection member becomes thick, thereby making it difficult to reduce the thickness in the incident optical axis direction.

For a light-quantity adjusting member such as an iris diaphragm, a shutter combined with the iris diaphragm, etc., a mechanism for moving iris diaphragm blades or shutter blades is needed in order to adjust the quantity of passage light, so that the peripheral structure of the light-quantity adjusting member is enlarged. Further, in order to cause such enlarged ones to move during the zooming operation, it is necessary for them to secure space for their motions, thereby preventing the achievement of the miniaturization of the zoom lens. Accordingly, by causing the light-quantity adjusting member to be fixed during the zooming operation, miniaturization of the zoom lens is promoted.

Alternatively, instead of changing an iris diameter for adjusting the quantity of light, a ND filter or a liquid crystal light-adjustment device may be used for facilitating further miniaturization.

It is preferable that the plurality of imaging devices are arranged so as to be shifted in perpendicular and horizontal directions with respect to at least one of the imaging devices, which serve as references.

Below, embodiments of a zoom lens system in an imaging apparatus in accordance with the present invention and numerical examples which apply specific values to the embodiments will be described with reference to the drawings.

FIGS. 1 through 4 show a first embodiment of the zoom lens system and a numerical example 1 which applies specific values to the first embodiment.

FIG. 1 shows a lens structure of a zoom lens system 1 in accordance with the first embodiment. The zoom lens system 1 includes a first lens group GR1 having positive refracting power, a second lens group GR2 having negative refracting power, a third lens group GR3 having positive refracting power, a fourth lens group GR4 having negative refracting power, a fifth lens group GR5 having positive refracting power, a color-separation prism PR and a filter LPF, which are arranged in order from the object side. The first lens group GR1 includes a negative lens G1, a right-angle prism G2 for bending an optical axis by 90 degrees, a positive lens G3 whose both sides are constructed to be aspheric and a positive lens G4. The second lens group GR2 includes a negative lens G5 and combination lenses of a negative lens G6 and a positive lens G7. The third lens group GR3 includes a positive lens G8 whose both sides are constructed to be aspheric, and combination lenses of a positive lens G9 and a negative lens G10. The fourth lens group GR4 includes combination lenses of a negative lens G11 and a positive lens G12. The fifth lens group GR5 includes a positive lens G13 whose both sides are constructed to be aspheric. Further, the first lens group GR1 and the third lens group GR3 are fixed during the zooming operation, and the second lens group GR2, the fourth lens group GR4, and the fifth lens group GR5 are allowed to move. Furthermore, an aperture diaphragm S is located near an object side of the third lens group GR3 and is fixed during zooming.

Each value in the numerical example 1 which applies specific values to the zoom lens system 1 is shown in Table 1. In the table "si" indicates the i-th surface from the object side, "ri" indicates a curvature radius of the i-th surface from the object side, "di" indicates a surface separation between the i-th surface and the i+1-th surface from the object side, "ni" indicates a refractive index with respect to the d-ray, of the i-th glass material from the object side, and "vi" indicates an Abbe number with respect to the d-ray, of the i-th glass material from the object side. Further, "INFINITY" shows that the surface is a plane, and "ASP" shows that the surface is an aspheric surface.

In addition, it is assumed that the shape of an aspheric surface is expressed by the following mathematical formula 1:

$$x = \frac{y^2 \cdot c^2}{1 + (1 - (1+K) \cdot y^2 \cdot c^2)^{1/2}} + \Sigma A^i \cdot Y^i$$

where
x: a distance from a lens surface vertex in the optical axis direction,
y: a height in a direction perpendicular to the optical axis,
c: a paraxial curvature in a lens vertex,
ε: cone constant, and
Ai: i-th aspheric surface coefficient.

TABLE 1

| si | ri | di | ni | vi |
|---|---|---|---|---|
| 1 | r1 = 33.309 | d1 = 0.800 | n1 = 1.92286 | v1 = 20.884 |
| 2 | r2 = 13.230 | d2 = 2.300 | | |
| 3 | r3 = INFINITY | d3 = 11.800 | n2 = 1.84666 | v2 = 23.785 |

TABLE 1-continued

| si | ri | di | ni | vi |
|---|---|---|---|---|
| 4 | r4 = INFINITY | d4 = 0.431 | | |
| 5 | r5 = 35.283 (ASP) | d5 = 2.200 | n3 = 1.74330 | v3 = 49.326 |
| 6 | r6 = −69.861 (ASP) | d6 = 0.100 | | |
| 7 | r7 = 18.604 | d7 = 2.925 | n4 = 1.49700 | v4 = 81.608 |
| 8 | r8 = −33.322 | d8 = variable | | |
| 9 | r9 = −112.797 | d9 = 0.500 | n5 = 1.88300 | v5 = 40.805 |
| 10 | r10 = 6.956 | d10 = 1.850 | | |
| 11 | r11 = −10.002 | d11 = 0.540 | n6 = 1.77250 | v6 = 49.624 |
| 12 | r12 = 13.578 | d12 = 1.400 | n7 = 1.92286 | v7 = 20.884 |
| 13 | r13 = −26.091 | d13 = variable | | |
| 14 | APERTURE STOP = INFINITY | d14 = 1.200 | | |
| 15 | r15 = 11.728 (ASP) | d15 = 2.820 | n8 = 1.84666 | v8 = 23.785 |
| 16 | r15 = −112.098 (ASP) | d16 = 0.369 | | |
| 17 | r17 = 9.282 | d17 = 3.000 | n9 = 1.66672 | v9 = 48.297 |
| 18 | r18 = −7.147 | d18 = 0.550 | n10 = 1.92286 | v10 = 20.884 |
| 19 | r19 = 46.768 | d19 = variable | | |
| 20 | r20 = −17.385 | d20 = 0.640 | n11 = 1.80610 | v11 = 33.269 |
| 21 | r21 = 6.293 | d21 = 1.871 | n12 = 1.49700 | v12 = 81.608 |
| 22 | r22 = −77.041 | d22 = variable | | |
| 23 | r23 = 17.094 (ASP) | d23 = 2.000 | n13 = 1.48749 | v13 = 70.441 |
| 24 | r24 = −15.508 (ASP) | d24 = variable | | |
| 25 | r25 = INFINITY | d25 = 13.000 | n14 = 1.51680 | v14 = 64.198 |
| 26 | r26 = INFINITY | d26 = 1.000 | | |
| 27 | r27 = INFINITY | d27 = 0.500 | n15 = 1.51680 | v15 = 64.198 |
| 28 | r28 = INFINITY | | | |

In the zoom lens system 1, a surface separation d8 between the first lens group GR1 and the second lens group GR2, a surface separation d13 between the second lens group GR2 and the aperture diaphragm S, a surface separation d19 between the third lens group GR3 and the fourth lens group GR4, a surface separation d22 between the fourth lens group GR4 and the fifth lens group GR5, and a surface separation d24 between the fifth lens group GR5 and the color-separation prism PR are variable while zooming. Next, each value of the respective surface separations d8, d13, d19, d22, and d24 on the wide angle end, in the middle focal position, and on the telephoto end in the numerical example 1, is shown in Table 2 together with a focal distance, an F number, and a half an angle of view "ω (degree)".

TABLE 2

| FOCAL LENGTH | 6.90 | 12.76 | 33.80 |
|---|---|---|---|
| F$^{NUMBER}$ | 3.60 | 3.92 | 4.13 |
| ω$^{(DEGREE)}$ | 29.91 | 16.41 | 6.235 |
| d8 | 0.578 | 5.215 | 11.201 |
| d13 | 11.446 | 6.809 | 0.823 |
| d19 | 1.500 | 2.089 | 4.150 |
| d22 | 6.535 | 2.526 | 2.000 |
| d24 | 2.000 | 5.420 | 3.885 |

In the zoom lens system 1, both sides s5 and s6 of the positive lens G3 of the first lens group GR1, both sides s15 and s16 of the positive lens G8 of the third lens group GR3, and both sides s23 and s24 of the positive lens G13 which constitutes the fifth lens group GR5 are constructed to be aspheric. Next, each of the aspheric surface coefficients $A^4$, $A^6$, $A^8$, and $A^{10}$ of the fourth order, the sixth order, the eighth order, and the tenth order of each of the sides s5, s6, s15, s16, s23, and s24 in the numerical example 1 are shown in Table 3 with the cone constant $\epsilon$. In addition, "E+(or −) i" of an aspheric surface coefficient means "×10$^i$" or "×10$^{-i}$". The same applies to the following tables.

TABLE 3

| si | ε | $A^4$ | $A^6$ | $A^8$ | $A^{10}$ |
|---|---|---|---|---|---|
| 5 | 1 | −0.433026E−04 | 0.983407E−06 | −0.280456E−07 | 0.304946E−09 |
| 6 | 1 | −0.351433E−04 | 0.983060E−06 | −0.272593E−07 | 0.294836E−09 |
| 15 | 1 | 0.315625E−03 | 0.438174E−05 | 0.108540E−06 | 0.597606E−08 |
| 16 | 1 | 0.281652E−03 | 0.485658E−05 | 0.914854E−07 | 0.135825E−07 |
| 23 | 1 | −0.194742E−03 | 0.175416E−04 | −0.109494E−05 | 0.529685E−07 |
| 24 | 1 | 0.991329E−05 | 0.213102E−04 | −0.154243E−05 | 0.669146E−07 |

Figure 2:
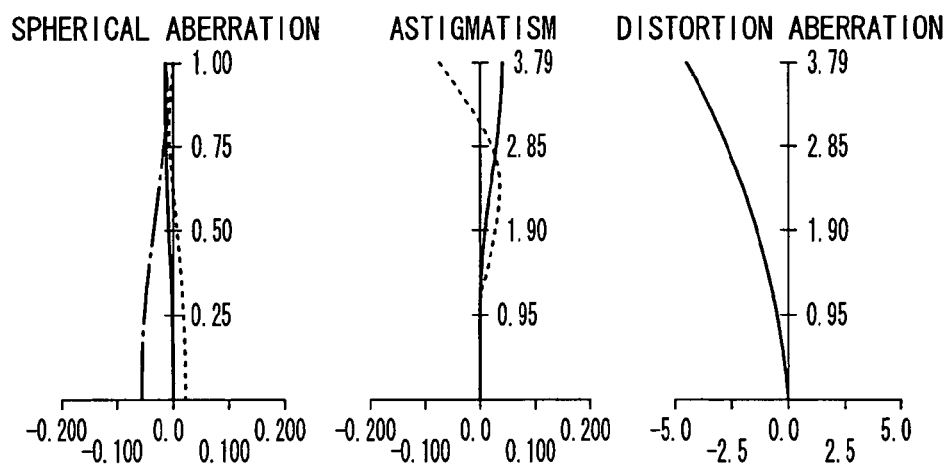
FIG. 2 is a graph showing, together with FIG. 3 and FIG. 4, a spherical aberration, an astigmatism, and a distortion aberration in a numerical example 1 which applies particular numbers, and shows these aberrations on a wide angle end.
Figure 3:
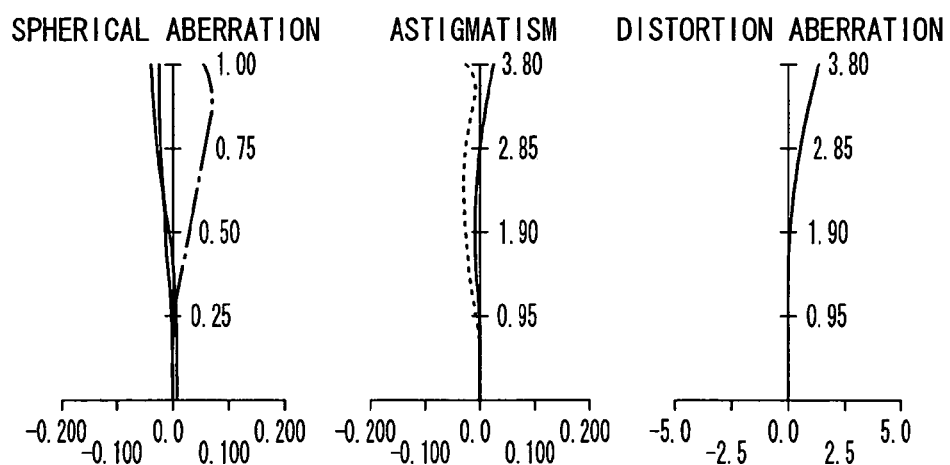
FIG. 3 is a graph showing the spherical aberration, the astigmatism, and the distortion aberration in a focal position intermediate the wide angle end and a telephoto end.
Figure 4:
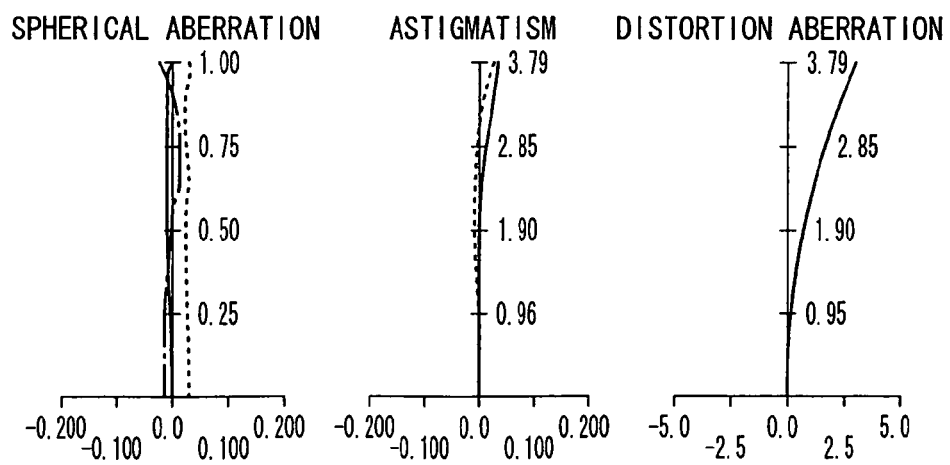
FIG. 4 is a graph showing the spherical aberration, the astigmatism, and the distortion aberration on the telephoto end.

FIGS. 2 through 4 show the spherical aberration, the astigmatism, and the distortion aberration at the wide angle end, a focal position intermediate the wide angle end and a telephoto end, and the telephoto end in the numerical example 1. In addition, in the spherical-aberration figures, a solid line indicates the d-ray (wavelength of 587.6 nm), a broken line indicates a c-ray (wavelength of 656.3 nm), and a dotted and dashed line shows an aberration curve with respect to a g-ray (wavelength of 435.8 nm). In the astigmatic figures, a solid line shows a sagittal image surface and a broken line shows a meridional image surface. The distortion aberration is expressed, letting a vertical axis be an image height and a horizontal axis be an amount of image distortion.

As shown in each of these aberration figures, each aberration is rectified with sufficient balance at the wide angle end, the focal distance intermediate the wide angle end and the telephoto end, and the telephoto end.

FIGS. 5 through 8 show a second embodiment of a zoom lens system and a numerical example 2 in which specific values are applied to the second embodiment.

Figure 5:
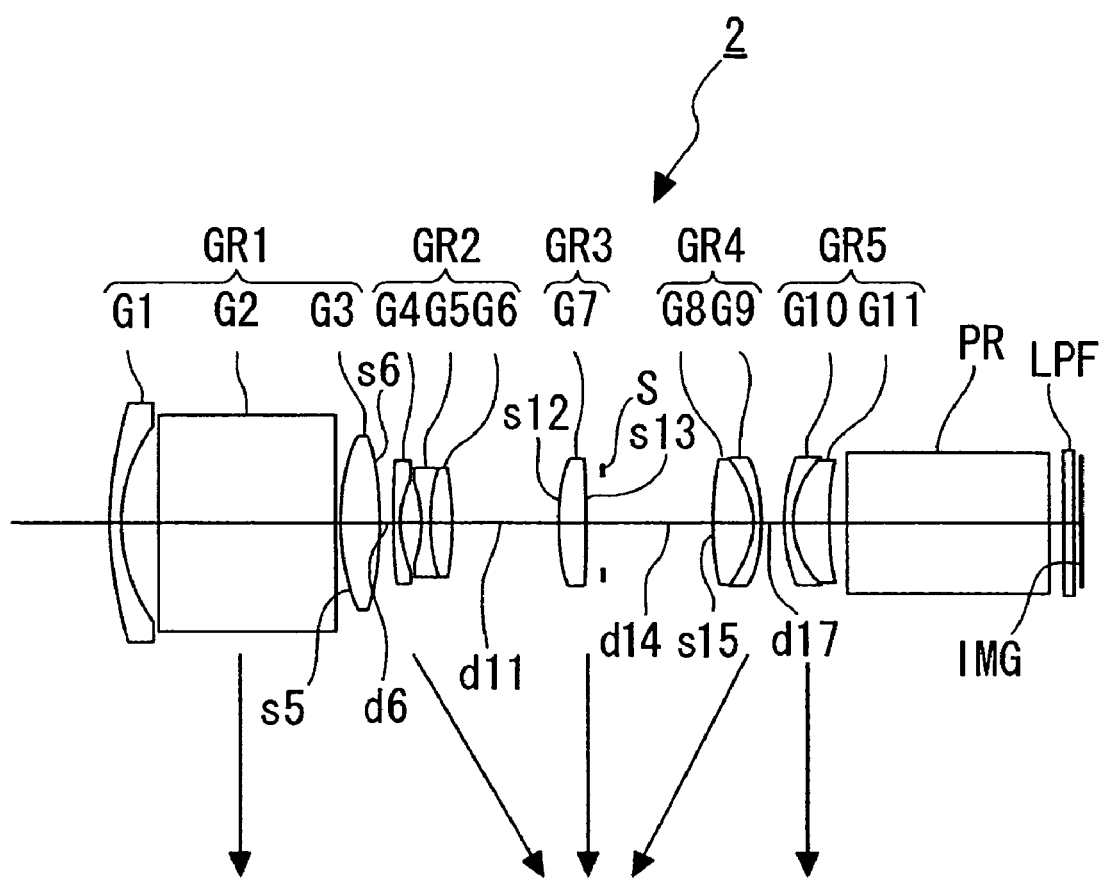
FIG. 5 is a diagram showing, together with FIGS. 6 through 8, a second embodiment of a zoom lens system in an imaging apparatus in accordance with an embodiment of the present invention, and showing a lens structure.

FIG. 5 shows a lens structure of a zoom lens system 2 in accordance with the second embodiment. The zoom lens system 2 includes the first lens group GR1 having positive refracting power, the second lens group GR2 having negative refracting power, the third lens group GR3 having positive refracting power, the fourth lens group GR4 having negative refracting power, the fifth lens group GR5 having positive refracting power, a color-separation prism PR, and a filter LPF, which are arranged in order from the object side. The first lens group GR1 includes the negative lens G1, the right-angle prism G2 for bending the optical axis by 90 degrees, and the positive lens G3 whose both sides are constructed to be aspheric. The second lens group GR2 includes combination lenses of the negative lens G4 and the negative lens G5 and the positive lens G6. The third lens group GR3 includes the positive lenses G7 whose both sides are constructed to be aspheric. The fourth lens group GR4 includes combination lenses of the positive lens G8 which has an aspheric surface on the object side, and the negative lens G9. The fifth lens group GR5 includes combination lenses of the negative lens G10 and the positive lens G11. Further, during the zooming operation, the first lens group GR1, the third lens group GR3, and the fifth lens group GR5 are fixed, and the second lens group GR2 and the fourth lens group GR4 may move. Furthermore, the aperture diaphragm S is located near the image side of the third lens group GR3, and is fixed during the zooming operation.

Each value in numerical example 2 which applies specific values to the zoom lens system 2 is shown in Table 4.

In the zoom lens system 2, a surface separation d6 between the first lens group GR1 and the second lens group GR2, a surface separation d11 between the second lens group GR2 and the third lens group GR3, a surface separation d14 between the aperture diaphragm S and the fourth lens group GR4, and a surface separation d17 between the fourth lens group GR4 and the fifth lens group GR5 are variable during zooming. Next, each value of the respective surface separations d6, d11, d14, and d17 on the wide angle end, in the middle focal position, and on the telephoto end in the numerical example 2, is shown in Table 5 together with a focal distance, an F number, and a half the angle of view "ω (degree)".

TABLE 5

| FOCAL LENGTH | 6.90 | 11.59 | 19.52 |
|---|---|---|---|
| F$^{NUMBER}$ | 2.85 | 3.08 | 3.38 |
| ω$^{(DEGREE)}$ | 29.99 | 17.88 | 10.71 |
| d6 | 0.830 | 4.093 | 6.795 |
| d11 | 6.466 | 3.203 | 0.500 |
| d14 | 6.665 | 4.072 | 2.000 |
| d17 | 1.400 | 3.993 | 6.065 |

In the zoom lens system 2, both sides s5 and s6 of the positive lens G3 of the first lens group GR1, both sides s12 and s13 of the positive lens G7 which constitutes the third lens group GR3, and the side s15 on the object side of the positive lens G8 of the fourth lens group GR4 are constructed to be aspheric. Next, each of aspheric surface coefficients A4, A6, A8, and A10 of the fourth order, the sixth order, the eighth order, and the tenth order of each of the sides s5, s6, s12, s13, and s15 in the numerical example 2 are shown in Table 6 with the cone constant ε.

TABLE 4

| si ri | di | ni | νi |
|---|---|---|---|
| 1 r1 = 23.859 | d1 = 0.650 | n1 = 1.92286 | ν1 = 20.884 |
| 2 r2 = 10.179 | d2 = 2.200 | | |
| 3 r3 = INFINITY | d3 = 10.500 | n2 = 1.84666 | ν2 = 23.785 |
| 4 r4 = INFINITY | d4 = 0.300 | | |
| 5 r5 = 15.018 (ASP) | d5 = 2.312 | n3 = 1.76802 | ν3 = 49.300 |
| 6 r6 = −21.808 (ASP) | d6 = variable | | |
| 7 r7 = 61.312 | d7 = 0.500 | n4 = 1.83500 | ν4 = 42.984 |
| 8 r8 = 8.063 | d8 = 1.192 | | |
| 9 r9 = −8.551 | d9 = 0.450 | n5 = 1.80420 | ν5 = 46.503 |
| 10 r10 = 12.459 | d10 = 1.195 | n6 = 1.92286 | ν6 = 20.884 |
| 11 r11 = −237.923 | d11 = variable | | |
| 12 r12 = 14.294 (ASP) | d12 = 1.593 | n7 = 1.80611 | ν7 = 40.734 |
| 13 r13 = −41.701 (ASP) | d13 = 1.000 | | |
| 14 APERTURE STOP = INFINITY | d14 = variable | | |
| 15 r15 = 25.265 (ASP) | d15 = 2.330 | n8 = 1.58313 | ν8 = 59.460 |
| 16 r15 = −5.936 | d16 = 0.550 | n9 = 1.84666 | ν9 = 23.785 |
| 17 r17 = −10.314 | d17 = variable | | |
| 18 r18 = 11.801 | d18 = 0.500 | n10 = 1.80610 | ν10 = 33.269 |
| 19 r19 = 5.263 | d19 = 2.000 | n11 = 1.48749 | ν11 = 70.441 |
| 20 r20 = 18.541 | d20 = 1.069 | | |
| 21 r21 = INFINITY | d21 = 12.000 | n12 = 1.51680 | ν12 = 64.198 |
| 22 r22 = INFINITY | d22 = 0.900 | | |
| 23 r23 = INFINITY | d23 = 0.500 | n13 = 1.51680 | ν13 = 64.198 |
| 24 r24 = INFINITY | | | |

TABLE 6

| si | ∈ | $A^4$ | $A^6$ | $A^8$ | $A^{10}$ |
|---|---|---|---|---|---|
| 5 | 1 | −0.449425E−04 | 0.428824E−05 | −0.193183E−06 | 0.670461E−08 |
| 6 | 1 | 0.301252E−04 | 0.410901E−05 | −0.175977E−06 | 0.657478E−08 |
| 12 | 1 | 0.907013E−04 | 0.212775E−04 | −0.128236E−05 | 0.763443E−07 |
| 13 | 1 | 0.221601E−03 | 0.300690E−04 | −0.212686E−05 | 0.114239E−06 |
| 15 | 1 | −0.858495E−04 | 0.941822E−05 | −0.808166E−06 | 0.314675E−07 |

Figure 6:
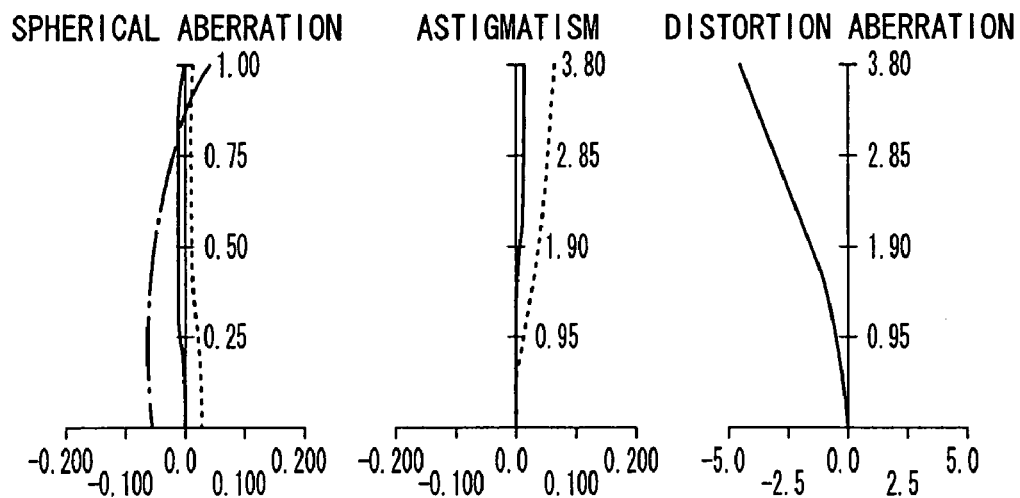
FIG. 6 is a graph showing, together with FIG. 7 and FIG. 8, the spherical aberration, the astigmatism, and the distortion aberration in a numerical example 2 which applies particular numbers, and shows these aberrations on the wide angle end.
Figure 7:
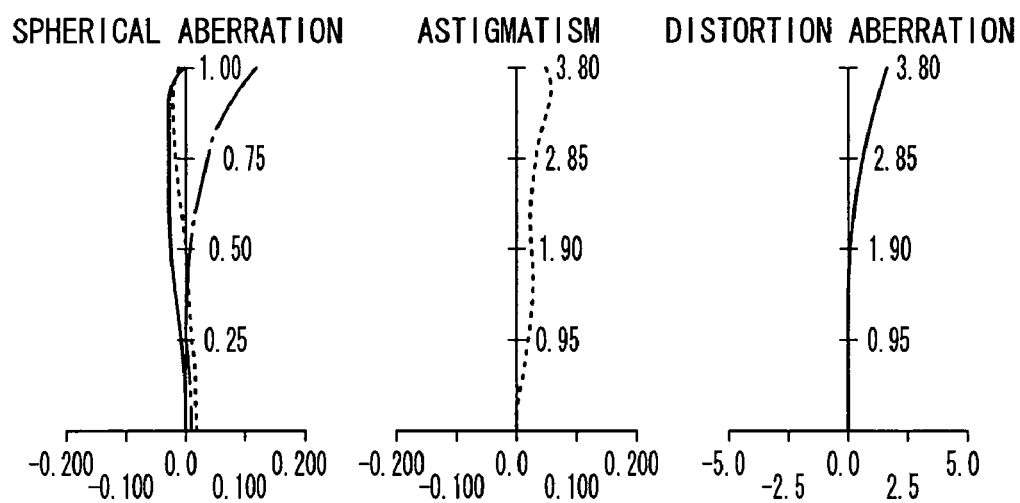
FIG. 7 is a graph showing the spherical aberration, the astigmatism, and the distortion aberration in the focal position intermediate the wide angle end and a telephoto end.
Figure 8:
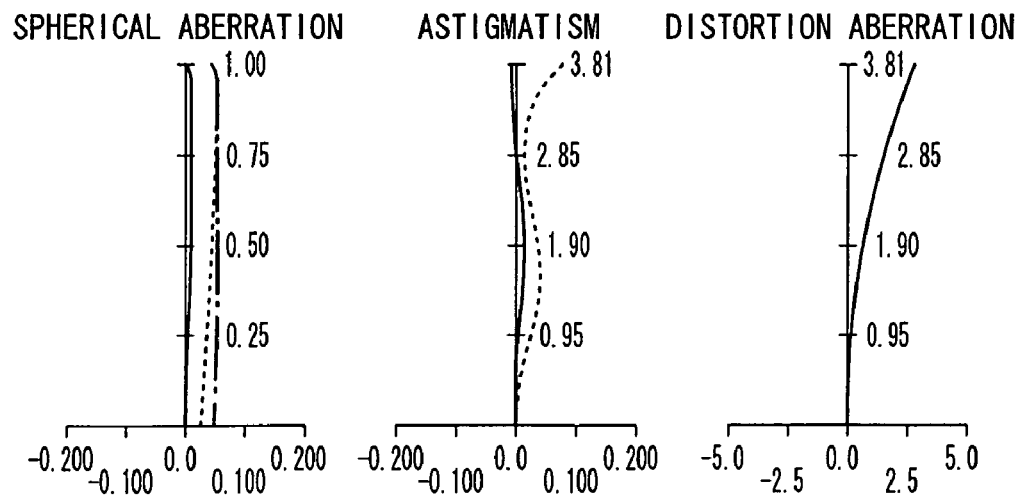
FIG. 8 is a graph showing the spherical aberration, the astigmatism, and the distortion aberration on the telephoto end.

FIGS. 6 through 8 show the spherical aberration, the astigmatism, and the distortion aberration at the wide angle end, the focal position intermediate the wide angle end and the telephoto end, and the telephoto end in the numerical example 2. In addition, in the spherical-aberration figures, a solid line indicates the d-ray (wavelength of 587.6 nm), a broken line indicates the c-ray (wavelength of 656.3 nm), and a dotted and dashed line shows an aberration curve with respect to the g-ray (wavelength of 435.8 nm). In the astigmatic figures, a solid line shows a sagittal image surface and a broken line shows a meridional image surface. The distortion aberration is expressed, letting a vertical axis be an image height and a horizontal axis be an amount of image distortion.

As shown in each of these aberration figures, each aberration is rectified with sufficient balance at the wide angle end, the focal distance intermediate the wide angle end and the telephoto end, and the telephoto end.

Table 7 shows corresponding values of each of the conditional expressions (1) and (2) in each numerical example.

TABLE 7

| CONDITIONAL FOMULA | NUMERICAL EXAMPLE 1 | NUMERICAL EXAMPLE 2 |
|---|---|---|
| (1) Tp/(Y' × S) | 0.775 | 0.450 |
| (2) Tp/Tcp | 0.908 | 0.875 |

FIGS. 9 through 12 show another embodiment in which an imaging apparatus in accordance with an embodiment of the present invention is built into a digital still camera.

Figure 9:
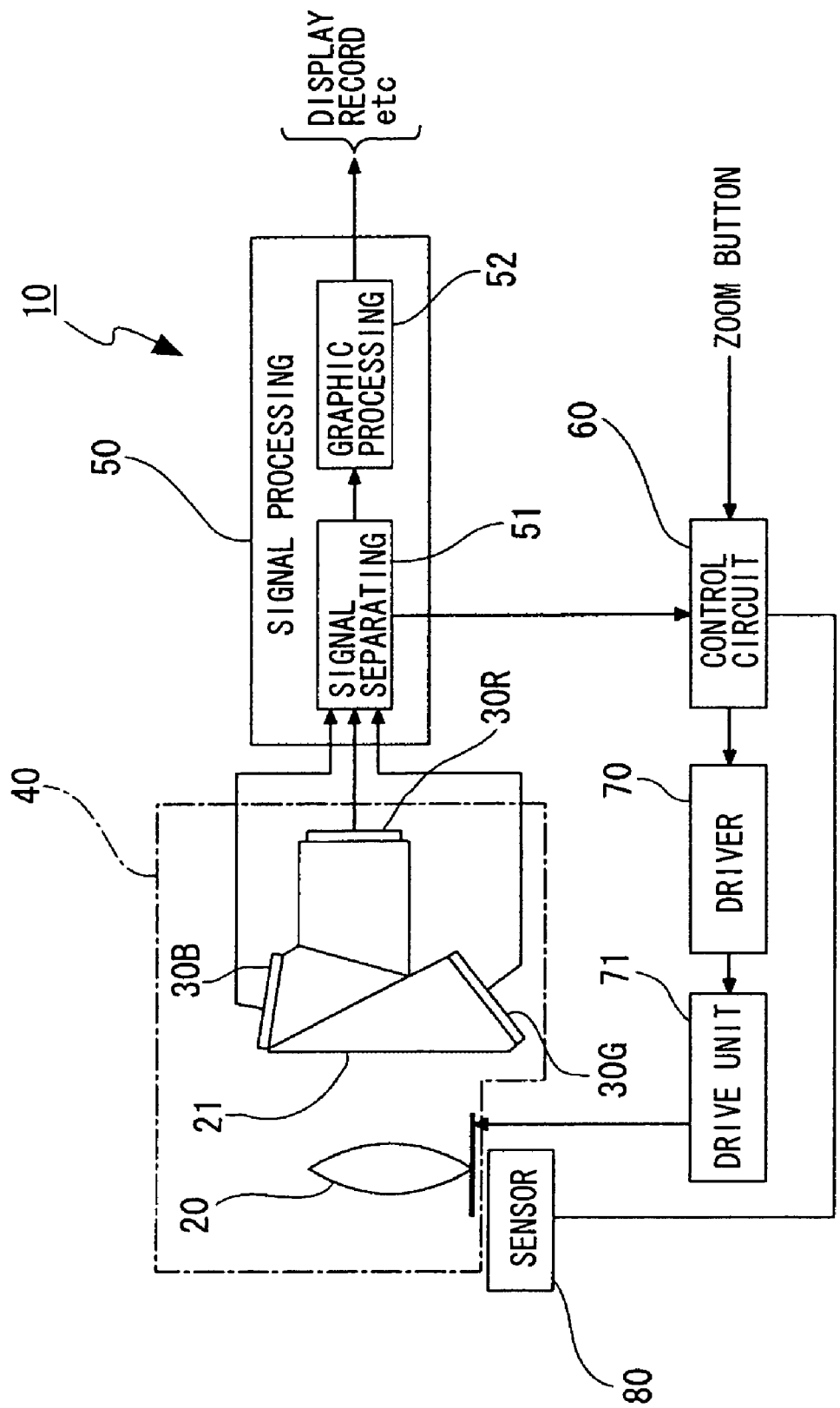
FIG. 9 a block diagram showing, together with FIG. 10 through FIG. 12, an example in which an imaging apparatus in accordance with an embodiment of the present invention is built in a digital still camera.

FIG. 9 is a block diagram showing a structural example of a digital still camera 10. The digital still camera 10 is capable of taking a moving picture in addition to a still picture and is provided with three imaging devices.

The digital still camera 10 is configured to include an imaging apparatus 40 that includes a zoom lens system 20 and three imaging devices 30. The imaging device 30 may be a photoelectric transducer such as a CCD (Charge Coupled Device), a CMOS (Complementary Metal-Oxide Semiconductor), etc. A zoom lens system according to the embodiments of the present invention may be employed as the zoom lens system 20. For example, the zoom lens systems 1 and 2 described in the first embodiment or the second embodiment may be used.

By means of a color-separation prism 21, imaging devices 30R, 30G, and 30R respectively receive color components of R (red), G (green), and B (blue) that are separated from light, and the respective imaging devices 30R, 30G, and 30R output electric signals corresponding to the received light quantities. Next, the electric signals outputted from the respective imaging devices 30R, 30G, and 30R are sent to a signal-processing circuit 50.

In the signal-processing circuit 50, firstly, a signal separating circuit 51 separates the electric signal into a video signal and a signal for focal control. The signal for focal control is sent to a control circuit 60, and the video signal is sent to an image processing circuit 52. Next, the signal sent to the image processing circuit 52 is processed into a form suitable for subsequent processing and is subjected to various processes, such as displaying by means of a display apparatus, recording in a recording medium, and transmission by communication means.

An operation signal, such as, for example, a zoom button operation, etc., is inputted from the outside into the control circuit 60 and is subjected to various processes according to the operation signal. For example, if zooming instructions are inputted through the zoom button, a drive unit (for example, a motor) 71 is operated through a driver circuit 70, and a movable lens group is moved to a predetermined position, in order to have a focal distance based on the instructions. The position information on the movable lens group obtained by each sensor 80 is inputted into the control circuit 60 and is referred to when outputting a command signal to the driver circuit 70. Further, the control circuit 60 checks the focal state based on the signal sent from the signal separating circuit 51 and controls the fourth lens group GR4, for example, through the driver circuit 70 so that the optimal focal state may be acquired.

A product incorporating the imaging apparatus in accordance with the present embodiment can take various forms in addition to the digital still camera. For example, the present invention is widely applicable to a camera unit of digital input/output devices, such as a digital video camera, a portable telephone into which a camera unit is incorporated, a PDA (Personal Digital Assistant) into which a camera unit is incorporated, etc.

Figure 10:
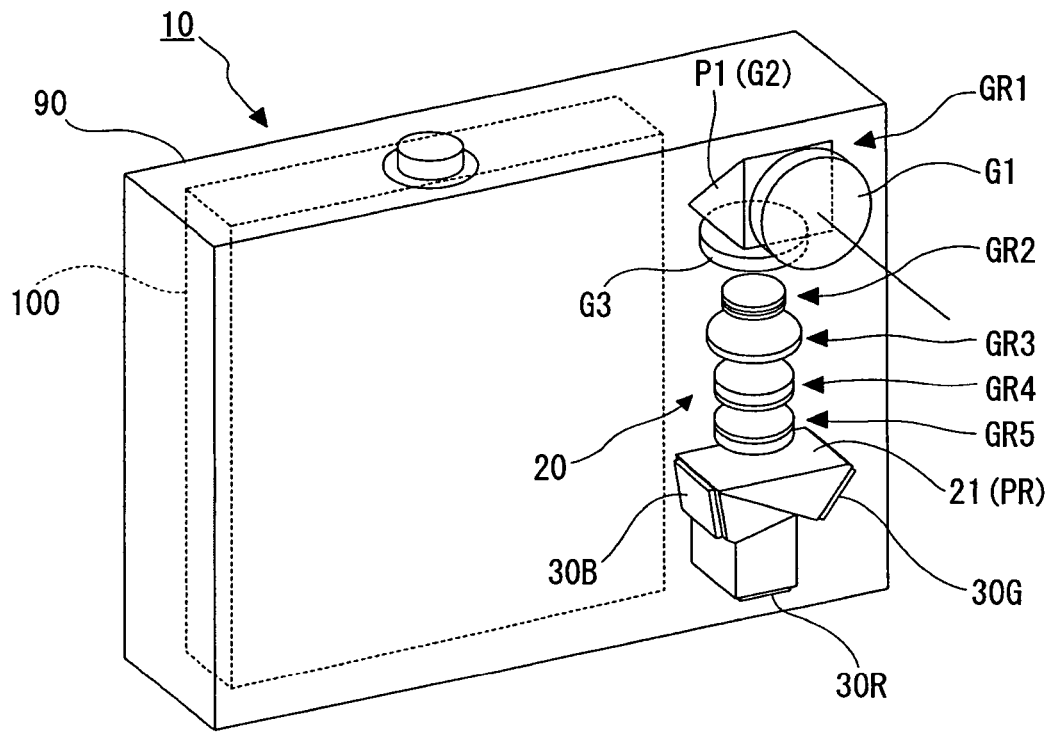
FIG. 10 is a schematic perspective view showing an example where a zoom lens system is arranged in a casing.

FIG. 10 shows an example of a structure incorporating a zoom lens system to a casing of the digital still camera 10.

Figure 11:
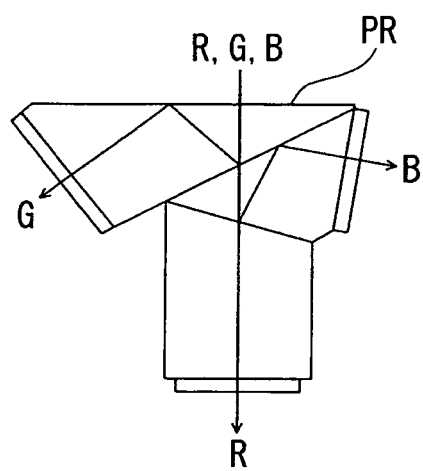
FIG. 11 is a diagram showing an aspect of color separation by means of a color-separation prism.
Figure 12:
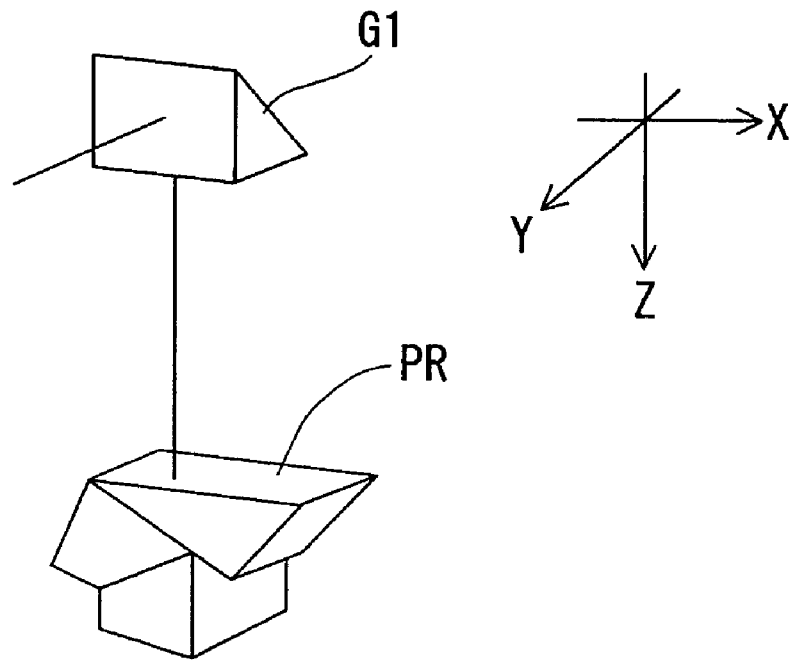
FIG. 12 is a schematic perspective view showing an example of a relationship between an optical axis of the zoom lens system and a color-separation direction by means of a color-separation prism.

A casing 90 of the digital still camera 10 is oblong and rectangular when viewed from the front. The first lens G1 of the zoom lens system 1 or 2 is located in the upper right position when viewed from the front and faces towards the front of the casing 90. Next, in the zoom lens system 1 or 2, the optical path is bent downwardly by 90 degrees by means of the first reflection member (right-angle prism) P1 provided in the first lens group GR1. Thus, the thickness of the casing 90, i.e., the dimension in the optical axis direction incident to the zoom lens system 1 or 2, may be reduced (thinned). Further, the zoom lens system 1 or 2 is arranged so as to extend from the upper right to the lower right when viewed from the front of the casing 90, whereby a large rectangular space is provided which spreads in the left when viewed from the front of the casing 90. Thus, a large liquid-crystal display panel 100 can be disposed in the large rectangular space. Furthermore, since a short side of the imaging device 30 which takes an oblong photographic subject image is directed along a front-to-back direction by bending the optical path by means of a reflection member P1, as described above, it is possible to use an imaging device which is large-sized and of high performance (the system of a higher number of pixels, or an electric capacity of each pixel is large and strong against a noise, and the latitude is large), even if the thickness of the casing 90 is reduced. In addition, FIG. 11 shows an aspect of color separation in the color-separation prism PR, and FIG. 12 shows an example of a relationship between the optical axis of the zoom lens system 1 or 2, and a color-separation direction by means of the color-separation prism PR. In other words, the light incident to the zoom lens system 1 or 2 in the Y-axis direction is bent in the Z direction by means of the right-angle prism P1 and is subjected to the color-separation on an X-Z flat surface by means of the color-separation prism PR.

Figure 13:
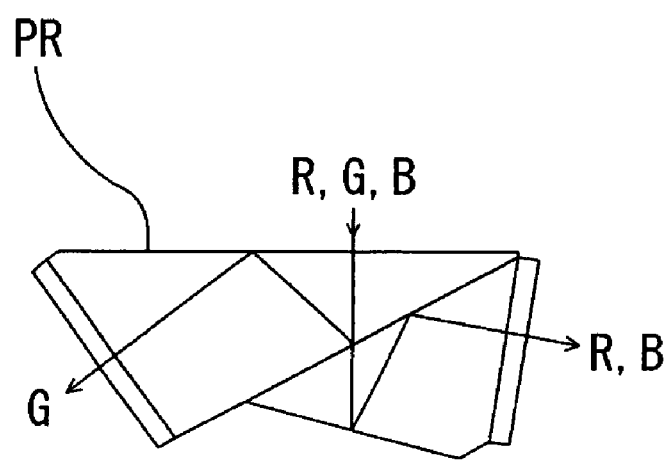
FIG. 13 is a diagram showing function of color separation by another color-separation prism.

Although in the embodiments the examples in which the color-separation prism for separating the light into three colors, R, G, and B is used are shown, a color-separation prism for separating the light into two colors as shown in FIG. 13 may, of course, be used.

In addition, the particular shapes, structures, and values of each part as shown in each embodiment and each numerical example are merely examples of the embodiment performed when implementing the present invention, and the technical scope of the present invention is not construed exclusively by them.

The present invention may be suitably applied to imaging apparatuses, a video camera, a digital still camera, a portable telephone, etc., in which a reduction in thickness and an increase of performance are appreciated.

It should be understood by those skilled in the art that various modifications, combinations, subcombinations and alterations may occur depending on design requirements and other factors insofar as they are within the scope of the appended claims or the equivalents thereof.

What is claimed is:

1. An imaging apparatus, comprising:
a zoom lens system including a plurality of groups and performing variable magnification by changing intervals of the lens groups;
a color-separation optical system configured to carry out color separation of a light flux from the zoom lens system; and
a plurality of imaging devices configured to convert optical images separated by colors by the color-separation optical system into electric signals;
wherein:
the zoom lens system includes at least one reflection member configured to bend an optical axis by 90 degrees or approximately 90 degrees, and
the color-separation optical system is arranged such that color-separation is performed in a direction within a plane perpendicular to another plane formed by an optical axis for light incident to the zoom lens system and an optical axis for light reflected by the reflection member, and
the reflection member satisfies a following conditional expression (1):

$$0.2 < Tp/(Y' \times S) < 1.5 \tag{1}$$

where Tp is a thickness of the reflection member, Y' is a diagonal length of the imaging device, and S is the number of the imaging devices included in the imaging apparatus.

2. The imaging apparatus according to claim 1, wherein:
the reflection member and the color-separation optical system satisfy a following conditional expression (2):

$$0.6 < Tp/Tcp < 1.5 \tag{2}$$

where Tp is a thickness of the reflection member, Tcp is an optical path length of the color-separation optical system.

3. An imaging apparatus, comprising:
a zoom lens system including a plurality of groups and performing variable magnification by changing intervals of the lens groups;
a color-separation optical system configured to carry out color separation of a light flux from the zoom lens system; and
a plurality of imaging devices configured to convert optical images separated by colors by the color-separation optical system into electric signals;
wherein:
the zoom lens system includes at least one reflection member configured to bend an optical axis by 90 degrees or approximately 90 degrees, and
the color-separation optical system is arranged such that color-separation is performed in a direction within a plane perpendicular to another plane formed by an optical axis for light incident to the zoom lens system and an optical axis for light reflected by the reflection member,
the zoom lens system includes a first lens group configured to have a positive refracting power and be fixed during the zooming operation, and the reflection member is included in the first lens group, and
the reflection member satisfies a following conditional expression (1):

$$0.2 < Tp/(Y' \times S) < 1.5 \tag{1}$$

where Tp is a thickness of the reflection member, Y' is a diagonal length of the imaging device, and S is the number of the imaging devices included in the imaging apparatus.

4. The imaging apparatus according to claim 3, wherein:
the reflection member and the color-separation optical system satisfy a following conditional expression (2):

$$0.6 < Tp/Tcp < 1.5 \tag{2}$$

where Tp is a thickness of the reflection member, Tcp is an optical path length of the color-separation optical system.

5. An imaging apparatus, comprising
a zoom lens system including a plurality of groups and performing variable magnification by changing intervals of the lens groups;
a color-separation optical system configured to carry out color separation of a light flux from the zoom lens system; and
a plurality of imaging devices configured to convert optical images separated by colors by the color-separation optical system into electric signals;
wherein:
the zoom lens system includes at least one reflection member configured to bend an optical axis by 90 degrees or approximately 90 degrees, and
the color-separation optical system is arranged such that color-separation is performed in a direction within a plane perpendicular to another plane formed by an optical axis for light incident to the zoom lens system and an optical axis for light reflected by the reflection member, and
the reflection member and the color-separation optical system satisfy a following conditional expression (2):

$$0.6 < Tp/Tcp < 1.5 \tag{2}$$

where Tp is a thickness of the reflection member, Tcp is an optical path length of the color-separation optical system.

6. An imaging apparatus, comprising:
a zoom lens system including a plurality of groups and performing variable magnification by changing intervals of the lens groups;
a color-separation optical system configured to carry out color separation of a light flux from the zoom lens system; and
a plurality of imaging devices configured to convert optical images separated by colors by the color-separation optical system into electric signals;
wherein:
  the zoom lens system includes at least one reflection member configured to bend an optical axis by 90 degrees or approximately 90 degrees, and
  the color-separation optical system is arranged such that color-separation is performed in a direction within a plane perpendicular to another plane formed by an optical axis for light incident to the zoom lens system and an optical axis for light reflected by the reflection member,
  the zoom lens system includes a first lens group configured to have a positive refracting power and be fixed during the zooming operation, and the reflection member is included in the first lens group, and
  the reflection member and the color-separation optical system satisfy a following conditional expression (2):

$$0.6 < Tp/Tcp < 1.5 \qquad (2)$$

where $Tp$ is a thickness of the reflection member, $Tcp$ is an optical path length of the color-separation optical system.

* * * * *